J. P. EVANS & R. P. AKINS.
CONCENTRATOR.
APPLICATION FILED OCT. 28, 1904.
932,691.
Patented Aug. 31, 1909.
4 SHEETS—SHEET 1.
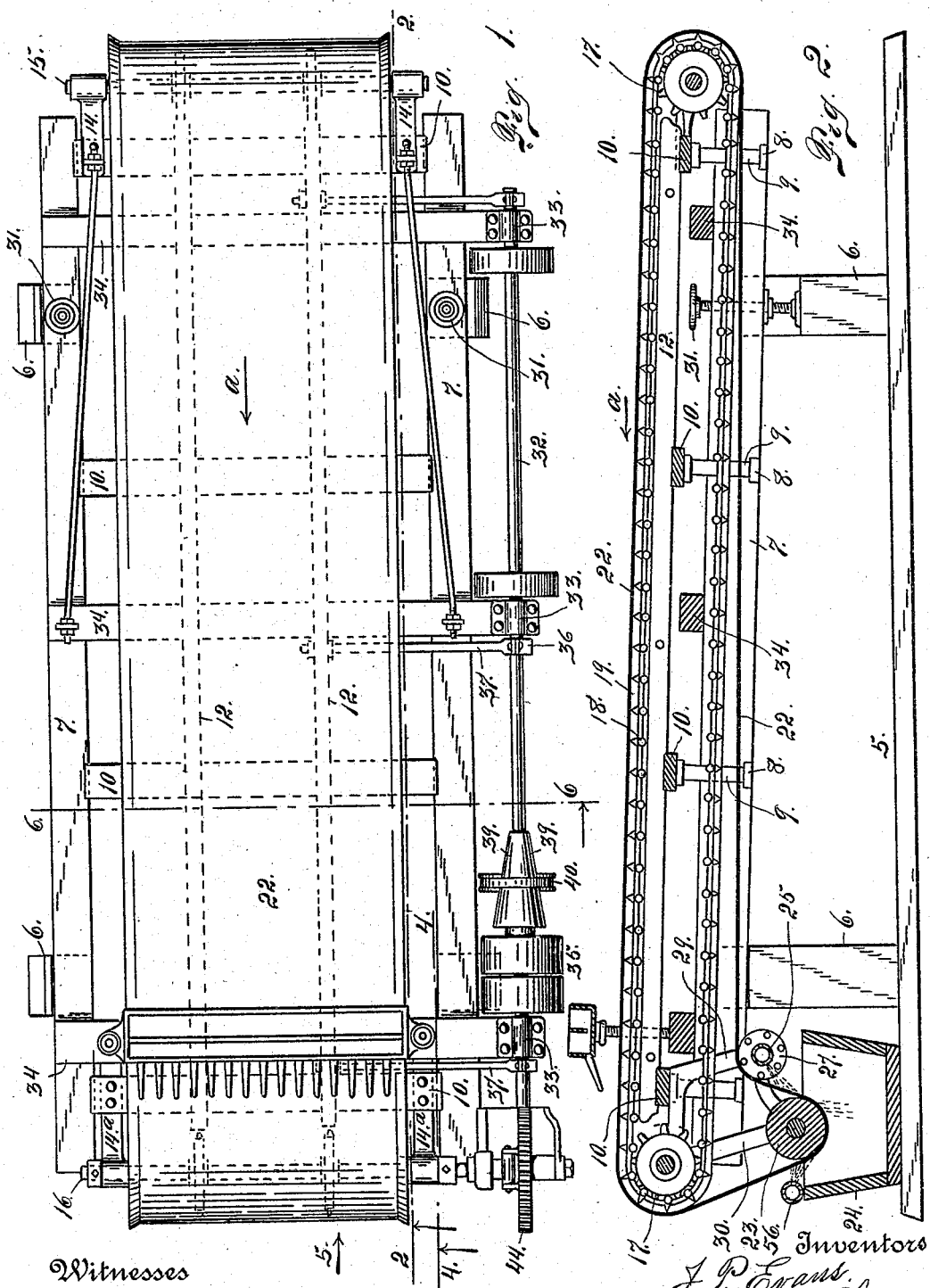

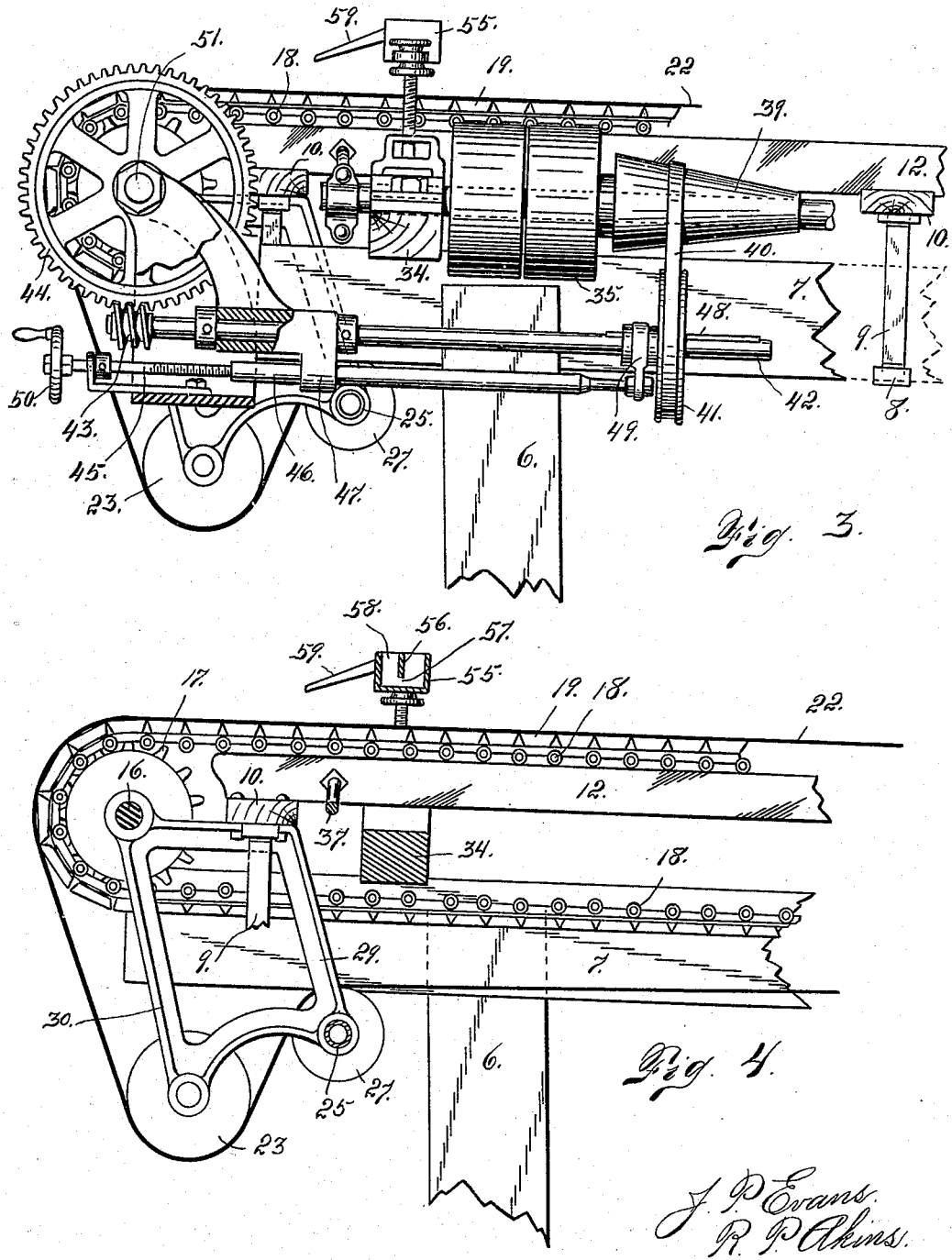

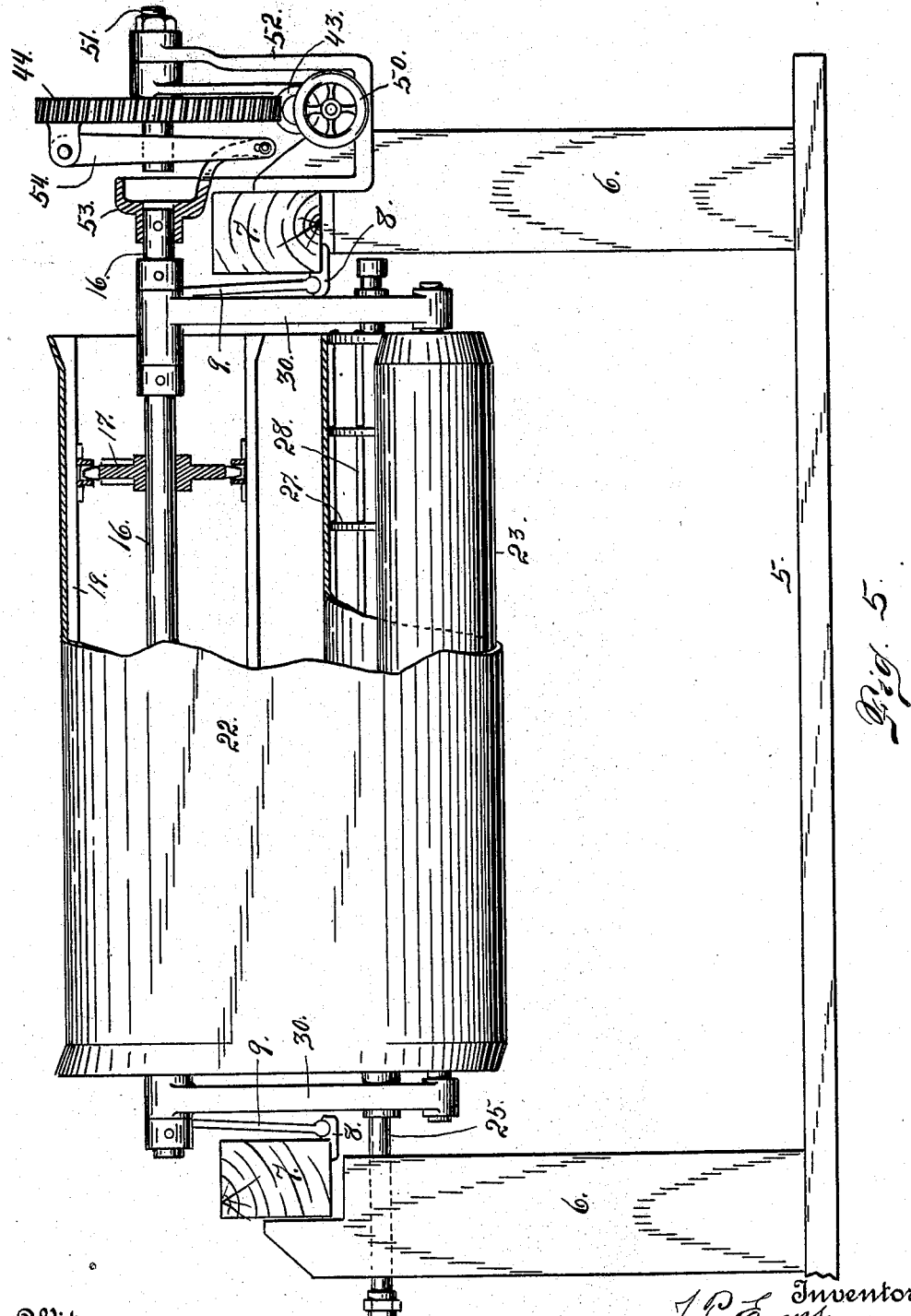

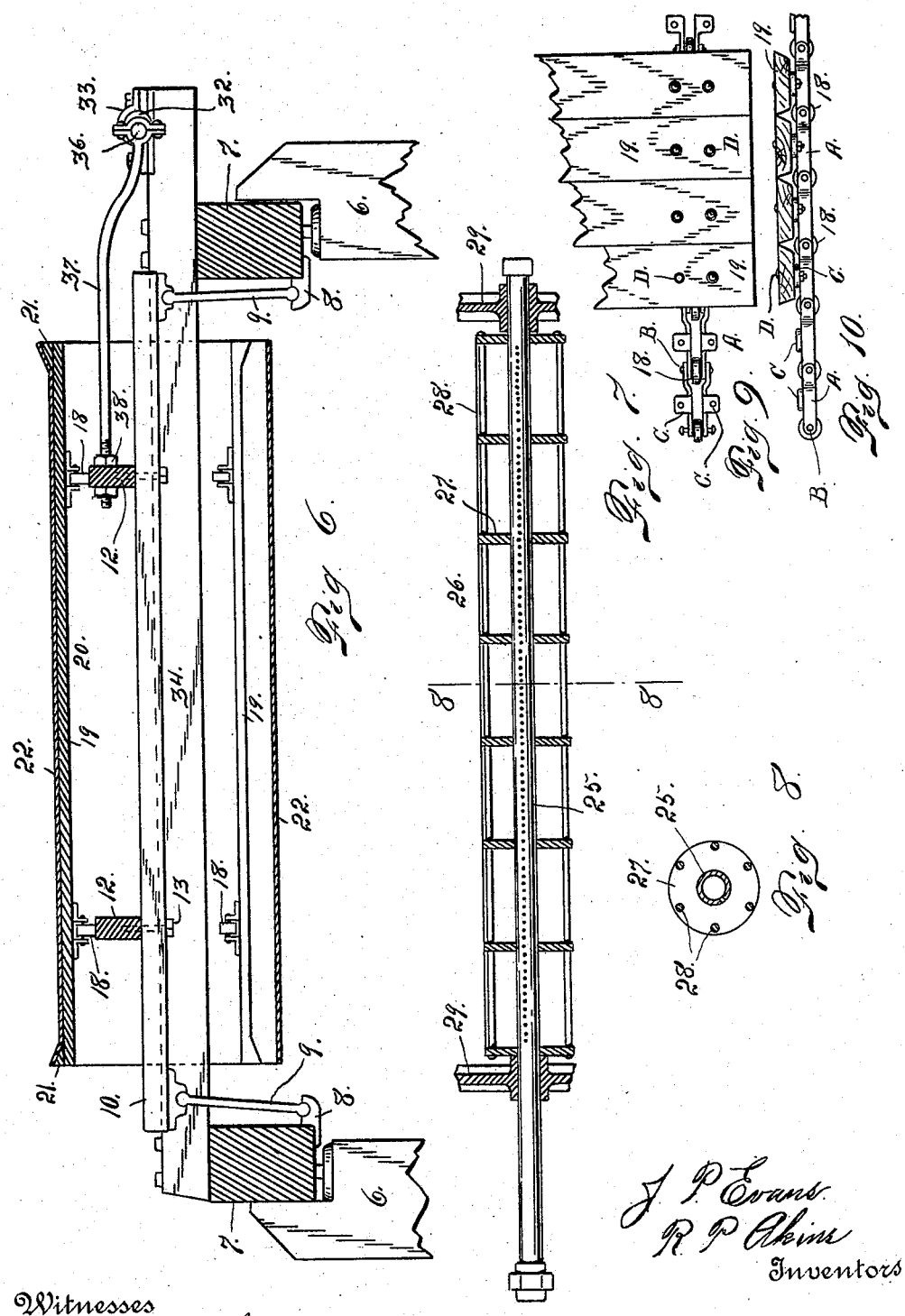

UNITED STATES PATENT OFFICE.

JAMES P. EVANS AND RANDALL P. AKINS, OF DENVER, COLORADO.

CONCENTRATOR.

932,691.  Specification of Letters Patent.  Patented Aug. 31, 1909.

Application filed October 28, 1904. Serial No. 230,331.

*To all whom it may concern:*

Be it known that we, JAMES P. EVANS and RANDALL P. AKINS, both citizens of the United States, residing in the city and county of Denver and State of Colorado, have invented certain new and useful Improvements in Concentrators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in concentrators of the class known as belt machines or machines in which an endless belt or traveling apron is mounted on a vibratory frame.

In this specification our improvement is shown in connection with the vanner movement, a laterally vibratory motion being imparted to the frame upon which the traveling belt is mounted. The broad distinction between our improved construction and other belt machines, consists in the fact that while other machines so far as we are aware employ a heavy expensive belt arranged to travel on the vanner frame, we employ an endless carrier upon which is mounted an endless apron or belt, the latter being distinct and separate from the carrier. This apron may be composed of canvas or other cheap material as compared with the heavy expensive rubber belts usually employed with this class of machines. We are enabled to employ a belt or apron of cheap construction, by reason of the fact that our belt or apron is reinforced and supported by a carrier underneath which while of comparative cheap construction is very durable. Where canvas is employed for our improved belt, we prefer to coat it upon its inner surface or that opposite its concentrating surface, with some material as water-proof paint adapted to partially fill the meshes, prevent the canvas from stretching and add to its durability. This coating may be very cheaply applied and at the same time leave the opposite surface of the canvas sufficiently rough to facilitate the catching of the mineral values which it is desired to separate from the gangue with which they are mingled in the material under treatment.

While we have shown in the drawing, mechanism for imparting the vanner movement to the machine, it must be understood that nothing is claimed on this particular operating mechanism since it is old in the art. It must also be understood that our improved construction may be employed in connection with other mechanism for imparting the vibratory movement to the frame upon which the traveling belt is mounted; or the traveling belt may if desired be mounted upon a stationary frame though it is preferred to mount it upon a frame having a vibratory motion.

Having briefly outlined our improved construction we will proceed to describe the same in detail reference being made to the accompanying drawing in which is illustrated an embodiment thereof.

In this drawing, Figure 1 is a top or plan view of a machine equipped with our improvements. Fig. 2 is a vertical longitudinal section of the same. Fig. 3 is a fragmentary side elevation of the machine, the parts being shown on a larger scale. Fig. 4 is a sectional view of the same. Fig. 5 is a front end elevation partly broken away and partly in section, looking in the direction of arrow 5 in Fig. 1. Fig. 6 is a vertical cross section taken on the line 6—6 Fig. 1 viewed in the direction of the arrow. Fig. 7 is an enlarged elevation partly in section illustrating the perforated pipe for discharging water upon the concentrating belt for the purpose of removing the concentrates. Fig. 8 is a section taken on the line 8—8 Fig. 7. Figs. 9 and 10 are top and side views respectively, illustrating the construction of the carrier.

The same reference characters indicate the same parts in all the views.

Let the numeral 5 designate a suitable stationary frame which as shown in the drawing is provided with upright posts 6 6 upon which are supported longitudinal side beams 7. These side beams 7 are provided with projections 8 in which are formed seats for the lower extremities of upwardly projecting links 9 whose upper extremities engage seats formed in transverse pieces 10 to which are secured longitudinal stringers 12 by means of bolts 13. The stringers 12 and transverse pieces 10, form a laterally oscillating frame to which are secured end brackets 14 and 14ª in which are journaled shafts 15 and 16. The brackets 14 and 14ª are bolted to the transverse pieces 10 located at the opposite ends of the vibratory frame. These shafts 15 and 16, are provided with sprocket wheels 17 which are engaged by rollers 18 mounted on jointed slats 19 forming an endless carrier designated in its entirety by the numeral 20. Between the end shafts, the rollers 18 engage the stringers 12 and form antifrictional bearings for the endless carrier. The transverse slats 19 of which the carrier is composed, are reinforced at their extremities as shown at 21, whereby the outer edges of the endless traveling belt 22 are upwardly inclined, to prevent the material carried by the belt from passing over its longitudinal edges. It will be understood that in a machine of this class the gangue or worthless material is discharged at the foot or lower end of the belt, while the concentrates are discharged at the upper end or head of the machine. Hence it is necessary that some provision be made to prevent the material from passing over the longitudinal edges of the concentrating belt.

It will be seen that the upper length of the belt 22 upon which the material is fed for treatment, is reinforced and supported underneath by the carrier 20, while after the belt reaches the head of the machine, it is free to leave the carrier and passes downwardly underneath a roller 23 whereby the belt is caused to travel through water placed in the receptacle 24 for the purpose of removing the accumulated concentrates. As the belt is leaving this receptacle 24, it is further acted on by water discharged from a transverse pipe 25 upon which is journaled a drum 26 composed of disks 27 and connecting rods 28. This drum rotates freely on the shaft, the latter being mounted in depending parts 29 of the brackets 14ª. The roller 23 is journaled in depending parts 30 of the same brackets.

The stationary frame upon which the vibratory frame is mounted, should be so adjusted that the portion of the endless belt and carrier farther to the right referring to Figs. 1 and 2, is lower than the extreme left hand portion of the same construction. In other words the upper portion of the endless belt is downwardly inclined from the head or left hand extremity of the machine referring to these views, to the tail or left hand extremity thereof. The inclination of the vibratory frame is regulated by means of screws 31 threaded in the side beams 7 which form a support for the oscillating links 9 upon which the vibratory frame is mounted as heretofore explained.

The manner of imparting the lateral vibratory movement to the vibrating frame will now be described. A shaft 32 is journaled in suitable bearings 33 mounted on transverse bars 34 secured to a longitudinal beam 7. This shaft 32 is rotated in any suitable manner. As shown it is provided with fast and loose pulleys 35 whereby the movement of the shaft may be controlled by connecting the pulleys with the belt leading from a line shaft as will be readily understood. Leading from eccentrics 36 on this shaft are pitmen 37 whose extremities remote from the shaft are connected with the stringers 12 as shown at 38 and best illustrated in Fig. 6. As shown in the drawing there are three pitmen 37 which through the instrumentality of the shaft and eccentrics, impart the lateral vibration to the vanner frame upon which the traveling concentrating belt and endless supporting carrier are mounted. The manner of transmitting motion to the said carrier and belt will now be described. From a cone pulley 39 on the shaft 32, a belt 40 leads to a pulley 41 fast on a shaft 42 suitably journaled and provided with a worm 43 which engages a worm wheel 44 fast on a short shaft 51 journaled in a stationary bracket 52 at the head of the machine, the said shaft 51 being in line with the shaft 16. The bracket 52 is mounted on the stationary frame, and the worm wheel 44 is connected with a bracket 53 fast on the adjacent extremity of the shaft 16, by a link 54, whereby the belt frame is allowed the lateral vibratory movement heretofore explained, this movement being permitted simultaneously with the rotation of the worm wheel 44 and the travel of the belt and carrier imparted by the worm wheel (see Fig. 5). In this manner, as the shaft 32 is rotated, a comparatively slow movement is imparted to the endless belt and carrier in the direction of the arrows a in Figs. 1 and 2.

A feed screw 45 threaded in a shaft 46 slidably mounted in a suitable bearing 47, acts to shift the pulley 41 on the shaft 42, the pulley being splined on the shaft as indicated at 48. The endwise movable shaft 46 is connected with the hub of the pulley 41, as shown at 49. In this manner the belt 40 may be moved back and forth upon the cone pulley 39, for the purpose of regulating the speed of travel of the endless belt and carrier, as will be readily understood. The outer extremity of the feed screw is provided with a hand wheel 50 to facilitate the operation of the screw for the purpose stated.

As shown in the drawing (see Figs. 2, 3 and 4), a vertically adjustable pulp box 55 is mounted above the belt near the head of the machine. This box is provided with a centrally located partition 56 whose lower edge does not reach the bottom of the trough, whereby a space 57 is left for the pulp to pass underneath to the forward compartment 58 of the box. This partition is employed for the purpose of distributing the pulp in the box and causing it to be fed evenly crosswise of the belt. Leading from the compartment 58 of this trough, is a number of downwardly inclined discharge spouts 59 which deliver the pulp upon the belt when the machine is in operation.

It will be understood that as the material is fed to the belt 22 which is traveling upwardly from the tail toward the head of the table, the water together with the gangue or worthless material, pass downwardly toward the tail of the machine where they are discharged; while the concentrates or values to be saved, are caused to settle on the concentrating surface of the belt 22 and are carried upwardly thereby over the head of the table and downwardly into the water of the receptacle 24, in which the concentrates are caught. This removal of the concentrates from the belt is aided by reason of the perforated water pipe 25. The perforations of this pipe are arranged in a row in such a position as to discharge jets of water downwardly upon the belt just as it is leaving the water of the receptacle 24. In this way the concentrates which have not been otherwise removed will be displaced and caused to fall into the said receptacle. A perforated water pipe 56, is also mounted on the receptacle 24 and discharges jets of water upon the concentrating surface of the belt, on the side of the roller 23 opposite from the pipe 25.

As shown in Figs. 9 and 10 of the drawing the slats 19 of the carrier are secured to links A which are connected by pins B upon which the rollers 18 are mounted. Each link is composed of two members and each member has a flange C. These flanges form supports for the slats and are apertured to receive devices for fastening the slats to the links. As shown in the drawing bolts D are employed for this purpose. The carrier is provided with two chains composed of the links A to which the slats 19 are secured as above stated.

Having thus described our invention, what we claim is:

In a concentrator, the combination with a suitable stationary frame and a vibratory frame mounted thereon, of an endless traveling belt or apron mounted on the vibratory frame, means for guiding the belt or apron downwardly for the purpose of removing the concentrates therefrom, a perforated pipe arranged to deliver water upon the belt, and a drum mounted on the said pipe and engaging the belt, the said drum being composed of disks and connecting rods, substantially as described.

In testimony whereof we affix our signatures in presence of two witnesses.

JAMES P. EVANS.
RANDALL P. AKINS.

Witnesses:
 ISABEL N. EVANS,
 W. C. DICKSON.